Nov. 29, 1960  B. M. HARRISON  2,962,244
AIRCRAFT SPEED AND COURSE MEASUREMENT
Original Filed Nov. 10, 1944  2 Sheets-Sheet 1

INVENTOR.
BERTRAM M HARRISON
BY
HIS ATTORNEY

United States Patent Office 2,962,244
Patented Nov. 29, 1960

2,962,244

AIRCRAFT SPEED AND COURSE MEASUREMENT

Bertram M. Harrison, Wellesley Hills, Mass., assignor to Raytheon Company, a corporation of Delaware Continuation of application Ser. No. 719,794, Jan. 2, 1947, which is a division of application Ser. No. 562,873, Nov. 10, 1944. This application June 10, 1957, Ser. No. 664,845

9 Claims. (Cl. 244—77)

The present application is a continuation of my copending application Ser. No. 719,794, filed January 2, 1947, now abandoned, which is a division of application Ser. No. 562,873, filed November 10, 1944, now abandoned.

The present invention relates to a method and apparatus for determining the true course and ground speed of aircraft in flight.

My invention will best be understood from the following description taken in connection with the accompanying drawings in which.

In order to determine the ground speed of aircraft, I make use of the well-known Doppler principle, according to which the frequency of received wave energy is greater than the frequency of the source of such wave energy when the receiving station and the transmitting station are approaching each other, and is less than the frequency of the source when the transmitting station and the receiving station are moving away from each other.

Generally stated, I transmit directively from an aircraft high-frequency electromagnetic wave radiations at an angle toward the ground and receive reflected waves. If the transmitter and receiver units are so positioned on the aircraft as to be aimed perpendicularly to the line of flight, the frequency difference between transmitted and reflected waves, due to the Doppler effect, will be zero, whereas if the transmitter and receiver units be aimed parallel to the line of flight, there will be a maximum difference in frequency between the transmitted and reflected waves, the amount of which is directly proportional to the speed of the airplane. Therefore, the direction of the plane, that is, the true course with respect to the ground, can be determined with respect to the fore and aft line of the plane by determining the direction in which a wave transmitter and receiver must be positioned for either zero or maximum frequency difference between transmitted and reflected waves.

Similarly, the true speed of the plane over the ground can be determined from a measure of the maximum difference in frequency between transmitted and reflected waves. The latter problem can be simplified somewhat if the speed of the plane relative to the air is known, for example, by means of an air speed indicator.

Figure 1:
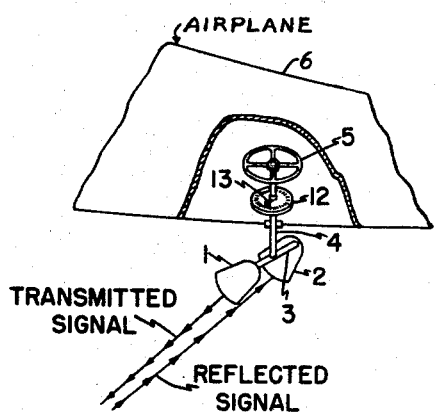
Fig. 1 shows one modification of a portion of the apparatus installed on an aircraft.

Commencing with the simplest arrangement, Fig. 1 shows an electromagnetic wave radiator 1 and a receiver 2 mounted on the airplane 6. The transmitter and receiver each consists of a suitable antenna mounted in a parabolic reflector, although any other suitable radiating and receiving elements may be used. The transmitter 1 and the receiver 2 are mounted on a support 3 which is rotatable about a normally vertical axis. The support 3 may thus be mounted on a shaft 4 rotatable by a hand wheel 5. The transmitter and receiver are shown projecting below the body 6 of the airplane with the hand wheel 5 within the plane. It will be obvious however that the transmitter and receiver may, if desired, be positioned within the plane, provided suitable apertures, or "windows," transparent to the electromagnetic wave radiations, are provided.

Figure 5:
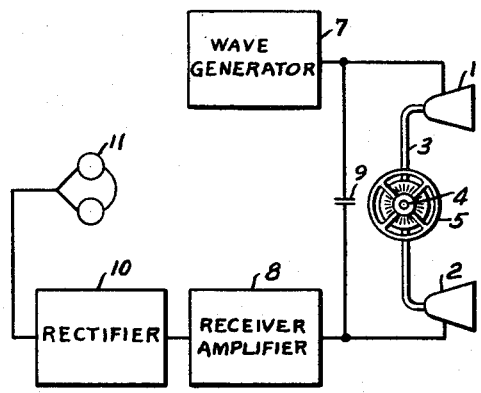
Fig. 5 is a schematic diagram of a modification of the invention.

As schematically shown in Fig. 5, the transmitter 1 is connected to a wave generator 7. This may be an impulse generator or preferably a continuous wave generator. Any conventional type of wave generator having the required definite frequency characteristics may be used. The receiver 2 is connected to a receiver amplifier 8 which may likewise be of conventional design. The receiver amplifier 8 is also connected to the wave generator through a condenser 9, or some other suitable means whereby a small part of the generated frequency may be introduced into the receiver amplifier together with the signal received by the receiver 2. Beats will thus be produced between the transmitted and received frequencies. These are rectified by the rectifier 10 and may be heard in the telephones 11.

When the line of antennae 1 and 2, that is, the support 3, is rotated into a position in which it is at right angles to the actual direction of the motion of the plane with respect to the ground, the difference in frequency between the transmitted signal and the reflected signal will be a maximum and the sound heard in the telephone 11 will have the highest pitch. As the line of antennae is rotated away from this position, the pitch of the sound in the telephones will decrease until, when the line of antennae is parallel to the true course of the plane, the sound will disappear altogether. This direction can be determined from a dial 12 fastened to the body of the aircraft and a cooperating pointer 13 secured to the shaft 4. Thereby the direction of the true course with reference to the fore and aft axis of the plane is determined.

Figures 2, 3:
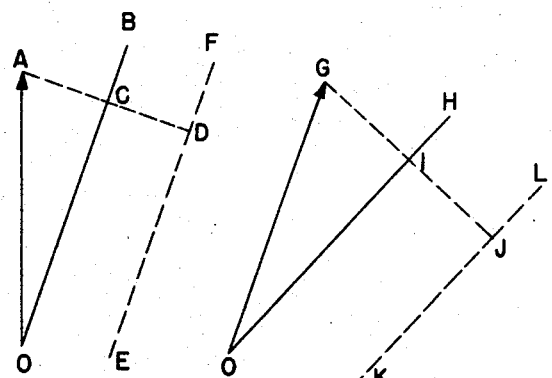
Figs. 2, 3 and 4 are vector diagrams illustrating the operation of my method.

The ground speed of the plane can now also be found in the following manner:

If the above information be plotted as shown in Fig. 2, the vector OA may be drawn to represent the air speed and direction of the plane as determined from an air speed indicator and a compass, and the line OB may be drawn in the direction determined for the true course. Now, since ground speed is the vector sum of air speed and the wind, it follows that the diagonal of a parallelogram of forces lies along the line OB. If we now draw line AD perpendicular from OB to A, and set distance CD equal to the distance AC, and draw line EF parallel to line OB, it is evident that one corner of the parallelogram must lie somewhere along the line EF.

The course of the plane is now changed and the true ground observation is repeated by rotating the antenna assembly. From the new observations, another vector diagram can be drawn, as in Fig. 3. OG will represent the new air speed and direction, with the line OH representing the new true course, whereby, making a similar construction to that described for Fig. 2, it is determined that one corner of the parallelogram of forces must lie along the line KL.

Figure 4:
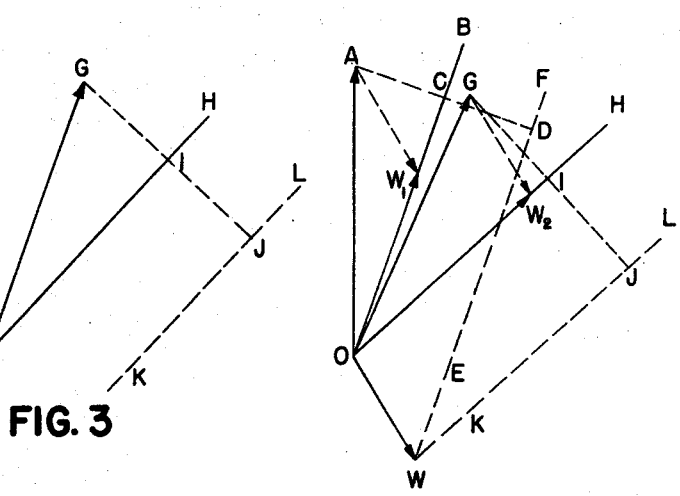

The diagrams of Figs. 2 and 3 are now superimposed, as shown in Fig. 4, whereby we have two parallelograms, each having one side in common with one side of the other, that is, the wind in each case is the same. Consequently, the intersection of the lines EF and KL, as shown at W in Fig. 4, determines the length and direction of the vector OW which corresponds to the wind speed and direction.

Laying off the vector OW from the point A as AW₁, the ground speed as well as direction of the plane in the case of Fig. 2 is determined by the vector OW₁. Similarly, laying off the vector OW from the point G as the vector GW₂, the true course and ground speed of the plane in the case of Fig. 3 are determined by the vector OW₂. Since the wind at high altitudes maintains direction and force constant for comparatively long periods of time, the vector OW can be applied to any speed and course and the true ground speed and course rapidly determined by making a single additional true course observation.

In all of the arrangements described herein, the transmitting and receiving reflectors are preferably arranged to have a directional beam characteristic directed toward the ground at an angle of approximately 45° with the vertical when the plane is horizontal. The best angle may vary somewhat depending upon conditions in each case; the angle of 45° represents a compromise between receiving a maximum amount of reflected energy and obtaining maximum frequency change due to Doppler effect. In order to make it possible to determine the position of maximum or minimum frequency difference with reasonable accuracy, I prefer to use a transmitted frequency of approximately 3,000 megacycles. In this case, the frequency change between the transmitted and reflected waves due to the Doppler effect will be approximately 3.166 cycles per second per mile per hour of plane speed when the beam is pointed directly forward or directly aft with respect to the true course over the ground.

It will be observed that the apparatus required to carry out my invention is relatively simple. Only conventional electrical units known to those skilled in the art are required. Some care must, however, be exercised to insure good shielding of the receiver antenna in order that the received reflected signal may be strong enough to permit comparison for the determination of frequency difference between it and the transmitted signal.

Figure 6:
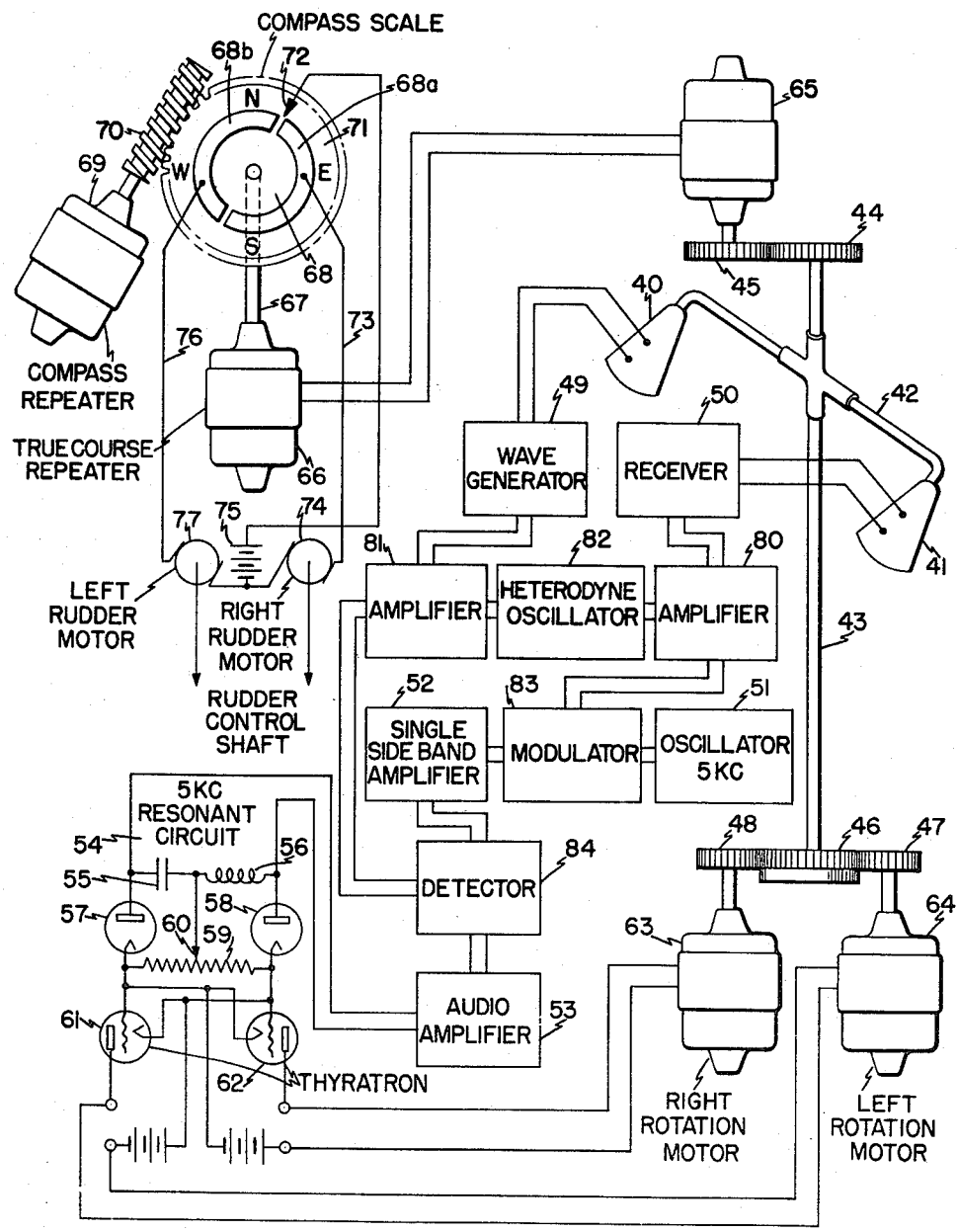
Fig. 6 is a schematic diagram of a further modification of the invention.

A further modification of my invention is shown in Fig. 6. This modification provides an automatic system for causing an aircraft to travel on a predetermined course with respect to the ground. The ordinary gyrocompass automatic pilot systems have been commonly used to keep a plane on a predetermined compass course. However, since an airplane is a body suspended in a volume of air which itself may be moving with respect to the earth, it is not sufficient to keep the plane headed toward a certain compass bearing in order to establish a predetermined course over the ground. This can, however, be accomplished by means of the present invention as arranged, for example, in the modification shown in Fig. 6.

Rotatably mounted on the aircraft, substantially in the same manner as previously described, are a transmitting antenna 40 and a receiving antenna 41. These are arranged to transmit and receive ultra-high-frequency electromagnetic waves and are directed downward toward the ground at an angle of approximately 45°. They are mounted on an arm 42, which is secured to a vertical rotatable shaft 43, having at its upper end a gear 44, and at its lower end a gear 46.

The transmitting antenna 40 is energized from a wave generator 49, while the receiving antenna 41 is connected to a receiving circuit 50. The output of receiver 50 is passed to an amplifier 80. Similarly, a small portion of the energy from wave generator 49 is amplified by an amplifier 81. Into both of these amplifiers 80 and 81, there is introduced the same high frequency from a heterodyne oscillator 82, which preferably has a frequency fairly close to the wave generator's frequency, so that the resultant beat frequencies will be of a fairly low order of magnitude. This will preserve the frequency difference between the transmitted signal and the reflected signal but will greatly increase the percentage difference between these two. For example, if the transmitted frequency is 3000 mc., the heterodyne oscillator may have a frequency of 2999 mc., whereby the output of ampifier 81 will have a frequency of 1000 kc.; similarly, the output of amplifier 80 will have a frequency of 1000 kc.± the maximum expected frequency change due to Doppler effect, for example, 1000 kc.±1 kc.

The output of amplifier 80 is passed to a modulator 83, into which is also fed a frequency which may be somewhere within the audible range, for example, 5 kc. The output of the modulator thus will contain frequencies equal to the output frequency of amplifier 80±5 kc., or in other words, 1005±1 kc. and 995±1 kc. The combined output of modulator 83 is then passed to a single side band amplifier 52, where one of these frequencies is amplified. This single side band frequency is then passed to a detector 84 into which is also fed the output of amplifier 81. The resulting beat frequency will be an audio frequency output equal to that of the oscillator 51 augmented or diminished by the frequency difference in cycles between the transmitted and reflected high frequency waves. This may be amplified by audio amplifier 53. The output of the latter is then passed to a frequency responsive circuit 54.

The circuit 54 includes in series across the output of amplifier 53 a condenser 55 and an inductance 56 in series with each other. These two elements are given values such that they will be in series resonance at the frequency of the heterodyne oscillator 51. Across this series resonant circuit there are connected two rectifier tubes 57 and 58, whose cathodes are joined by a resistor 59, having an adjustable contact 60, which is connected to the common terminal of condenser 55 and inductance 56. Thus, if the tuned circuit be resonant to 5 kc., it will be evident that for this frequency the voltage across the inductance will be equal to that across the condenser. If, however, the frequency impressed upon the resonant circuit be higher than 5 kc., a higher voltage will appear across inductance 56 than across condenser 55. Since the voltages across thet two portions of resistor 59 will oppose each other, there will thus appear across resistance 59 a resultant potential whose polarity depends upon whether the potential across inductance 56 or that across condenser 55 is the larger, and whose value depends upon the difference between those potentials.

Two gas-filled triodes, 61 and 62, have their grid circuits connected in opposite relation across resistance 59. The output of tube 62 is connected to a motor 63, whose shaft carries gear 48; which meshes with gear 46 on the antenna rotating shaft 43. Similarly, the output of tube 61 is supplied to a motor 64, whose shaft carries gear 47, which also meshes with gear 46. The motor 64 is arranged to rotate the gear 46 in the opposite direction from the rotation produced by motor 63.

Now considering the system so far described, the transmitting antenna 40 will send toward the ground a beam of electromagnetic waves of say 3000 mc. If the antennae are pointed somewhat in the general direction of motion of the plane over the ground, receiving antenna 41 will receive reflected waves having a frequency somewhat higher than 3000 mc.; let us say, 600 cycles per second greater. This received frequency, after suitable amplification in the receiver 80, is combined by heterodyne action with say 2999 mc. from oscillator 82, resulting in an output of 1000.6 kc. In modulator 83, this is combined with the 5 kc. produced by oscillator 51, so that the output of modulator 83 will include two side band frequencies, namely, in our example, 1005.6 kc. and 995.6 kc. One of these side band frequencies, say the higher side band, is amplified by amplifier 52 and passed to detector 84, where it is combined with the 1000 kc. from amplifier 81, so that the detector output then consists of the beat frequency of 5600 cycles. This is amplified by the audio amplifier 53 which should have a broad enough band to pass the heterodyne oscillator frequency± the greatest frequency variation which it is anticipated will be produced by Doppler effect between the transmitted and reflected waves. For example, the amplifier 53 may have a pass band of 5 kc.±1 kc. When the 5600 cycles is impressed upon the resonant circuit 54, a higher voltage will appear across the inductance 56 than across condenser 55, whereby the grid of tube 61 will become more positive, causing the tube to pass current through the left rotation motor 64. The antennae assembly 40, 41 is thereby rotated through the gears 47 and 46 in a direction to place the antennae 40, 41 in a line parallel to the direction of flight over the ground.

When that is obtained, the reflected wave received at 41 will have the same frequency as the transmitted wave. Consequently, the output of amplifier 53 will be equal in frequency to the frequency of the heterodyne oscillator, in the present case 5 kc. Since the voltages across both condenser 55 and inductance 56 will then be equal and opposite, the resultant voltage across resistor 59 will be zero, and neither tube 61 nor 62 will pass current.

Should the Doppler effect produce a lower reflected frequency than the transmitted frequency, which of course will be the case when transmitter and receiver are pointing more or less aft of the direction of flight, they will similarly be rotated into the position of zero Doppler by the operation of motor 63.

The position of the transmitter and receiver antennae with respect to the body of the aircraft is transmitted by gear 44 to a self-synchronous transmitter 65 by means of the gear 45. The self-synchronous transmitter 65 is connected to a self-synchronous motor 66. The latter has its shaft 67 connected to a commutator 68 consisting of two conducting rings 68a and 68b separated from each other by insulating segments. A compass repeater motor 69 through worm gear 70 drives a compass scale 71 in accordance with changes in the heading of the aircraft as determined by the craft's compass, for example, the gyrocompass.

The compass scale 71 is mounted concentrically with the shaft 67 and the commutator 68. An adjustable contact brush 72 is mounted on the compass scale 71 to move with the compass scale but in such a manner that its position can be adjusted with respect to the scale in accordance with the desired course of the aircraft. The contact ring 68a is connected by conductor 63 to a motor 74; the other terminal of the motor is connected to a battery 75, whose positive terminal is, in turn, connected to the brush 72; similarly the ring 68b is connected by conductor 76 to motor 77, which is also connected to the battery 75, the circuit again being completed through the brush 72. The motors 74 and 77 are arranged to operate the aircraft's rudder control shaft. Motor 74 may for example move the rudder to the right, while motor 77 moves the rudder to the left. It will be evident now that when the brush 72 is at an insulating segment between the split rings 68a and 68b, as shown in Fig. 6, neither of the rudder motors will operate.

If the aircraft should now change its course with respect to the ground, due for example to the motion of the air mass within which it is moving, the antennae 40, 41 will no longer be positioned for zero Doppler effect. Consequently one of the motors 63 or 64 will operate to move the antennae into the zero Doppler position. Self-synchronous transmitter 65 will thereby be rotated causing the self-synchronous motor 66 to rotate in synchronism. The commutator 68 is thereby rotated causing the brush 72 to make contact with either split ring 68a or 68b. Thereupon one of the motors 74 or 77 will operate to move the aircraft rudder in a direction to bring the aircraft back to the desired course. It will further be observed that, when the rudder is operated, the compass repeater 69 will also operate in response to the aircraft's change of heading, which likewise will tend to move the compass scale in a direction to move the brush 72 toward the insulating segment. There will thus take place a series of adjustments, as the craft changes its course, until the system reaches equilibrium with the aircraft traveling in the desired course over the ground, at which time the antennae 40 and 41 will be in the position of zero Doppler, and brush 72 will again be at the insulating segment.

It will be observed that by this operation the heading of the aircraft may have been changed with respect to compass direction, but it again travels over the desired course with respect to the ground. Should it now be desired to pursue a new course over the ground it will only be necessary for the navigator to move the brush 72 over the compass scale 71 to the desired bearing of the new course on the compass scale. The necessary rudder adjustments will then automatically take place until the aircraft is actually traveling along the new desired course.

What is claimed is:

1. A system for controlling the flight of an aircraft along a prescribed course over the ground including orientable horizontally directive means for transmitting from the aircraft a beam of high frequency electromagnetic waves, means for receiving reflected waves, means for producing from said transmitted and reflected wave energy a potential whose polarity and magnitude correspond to the direction and magnitude, respectively, of the frequency difference between said transmitted and reflected waves, means responsive to said potential for orienting said orientable means into a position at which there is zero frequency difference between transmitted and reflected waves, means for operating the aircraft's steering mechanism, and means responsive to orientation of said orientable means for activating said steering operating means.

2. A system for controlling the flight of an aircraft along a prescribed course with relation to the ground comprising: directional means for transmitting and receiving wave energy, directed toward the ground at an angle other than vertical; means for rotating said directional means about an axis substantially vertical during horizontal flight; a wave generator for supplying waves to be transmitted to the ground and a receiving circuit for waves reflected from the ground, connected to said wave transmitting and wave receiving means, respectively; whereby the Doppler effect causes a difference in frequency between the transmitted and received waves in accordance with the orientation of said directional means about said axis with relation to the actual course along the ground; means for modulating the output of said receiving circuit with a fixed frequency; a detector connected to both said generator and said modulating means for deriving from one sideband of the modulating means output and the generator output a voltage at the difference frequency of the two outputs; and means responsive to the frequency of said voltage for operating said rotating means in a direction tending to reduce the difference in frequency between said transmitted and received waves to zero.

3. A system for controlling the flight of an aircraft along a prescribed course with relation to the ground comprising: directional means for transmitting and receiving wave energy, directed toward the ground at an angle other than vertical; means for rotating said directional means about an axis substantially vertical during horizontal flight; a wave generator for supplying waves to be transmitted to the ground and a receiving circuit for waves reflected from the ground, connected to said wave transmitting and wave receiving means, respectively; whereby the Doppler effect causes a difference in frequency between the transmitted and received waves in accordance with the orientation of said directional means about said axis with relation to the actual course along the ground; means for modulating the output of said receiving circuit with a fixed frequency; a detector connected to both said generator and said modulating means for deriving from one sideband of the modulating means output and the generator output a voltage at the difference frequency of the two outputs; means responsive to the frequency of said voltage for operating said rotating means in a direction tending to reduce the difference in said frequency between said transmitted and received waves to zero; and means responsive to the operating of said rotating means for similarly altering the heading of the aircraft.

4. A system for controlling the flight of an aircraft along a prescribed course with relation to the ground comprising: directional means for transmitting and receiving wave energy, directed toward the ground at an angle other than vertical; means for rotating said directional means about an axis substantially vertical during horizontal flight; a wave generator for supplying waves to be transmitted to the ground and a receiving circuit for waves reflected from the ground, connected to said wave transmitting and wave receiving means, respectively; whereby the Doppler effect causes a difference in frequency between the transmitted and received waves in accordance with the orientation of said directional means about said axis with relation to the actual course along the ground; means for modulating the output of said receiving circuit with a fixed frequency; a single sideband filter connected to the output of said modulating means; a detector connected to both said generator and said filter for deriving from one sideband of the modulating means output and the generator output a voltage at the difference frequency of the two outputs; and means responsive to the frequency of said voltage for operating said rotating means in a direction tending to reduce the difference in frequency between said transmitted and received waves to zero.

5. A system for controlling the flight of an aircraft along a prescribed course with relation to the ground comprising: directional means for transmitting and receiving wave energy, directed toward the ground at an angle other than vertical; means for rotating said directional means about an axis substantially vertical during horizontal flight; a wave generator for supplying waves to be transmitted to the ground and a receiving circuit for waves reflected from the ground, connected to said wave transmitting and wave receiving means, respectively; whereby the Doppler effect causes a difference in frequency between the transmitted and received waves in accordance with the orientation of said directional means about said axis with relation to the actual course along the ground; means for modulating the output of said receiving circuit with a fixed frequency; a detector connected to both said generator and said modulating means for deriving from one sideband of the modulating means output and the generator output a voltage at the difference frequency of the two outputs; and means responsive to the frequency of said voltage for operating said rotating means in a direction tending to reduce the difference in frequency between said transmitted and received waves to zero, said last-mentioned means including inductive capacitive elements in a series circuit resonant to said fixed frequency, a resistor connected across the resonant circuit, a connection from the junction of the capacitive and inductive elements to an intermediate point of said resistor, and unidirectional conductor means connected between each end of the resistor and said resonant circuit.

6. A system for controlling the flight of an aircraft along a prescribed course with relation to the ground comprising: directional means for transmitting and receiving wave energy, directed toward the ground at an angle other than vertical; means for rotating said directional means about an axis substantially vertical during horizontal flight; a wave generator for supplying waves to be transmitted to the ground and a receiving circuit for waves reflected from the ground, connected to said wave transmitting and wave receiving means, respectively; whereby the Doppler effect causes a difference in frequency between the transmitted and received waves in accordance with the orientation of said directional means about said axis with relation to the actual course along the round; means for modulating the output of said receiving circuit with a fixed frequency; a detector connected to both said generator and said modulating means for deriving from one sideband of the modulating means output and the generator output a voltage at the difference frequency of the two outputs; and means responsive to the frequency of said voltage for operating said rotating means in a direction tending to reduce the difference in frequency between said transmitted and received waves to zero; said last mentioned means including inductive and capacitive elements in a series circuit resonant to said fixed frequency, a resistor connected across the resonant circuit, a connection from the junction of the capacitive and inductive elements to an intermediate point of said resistor, and unidirectional conductor means connected between each end of the resistor and said resonant circuit; first and second grid-controlled gaseous discharge tubes, the grid of the first tube and cathode of the second tube being connected to one end of said resistor, and the grid of the second tube and cathode of the first tube being connected to the other end of said resistor; and first and second electromotors for operating said rotating means, the first in one direction and the second in the other direction; a source of voltage for each motor; each motor being connected in a series circuit including the motor, a source of voltage, and the anode-cathode path of one of said tubes.

7. In an aircraft having automatic rudder control means, drift corrector means for said rudder control means comprising: means for transmitting a beam of wave energy from the aircraft to the ground at an angle other than vertical; means for receiving reflected waves; means for producing from said transmitted and reflected wave energy a potential whose polarity and magnitude correspond to the sense and magnitude, respectively, of the frequency difference due to the Doppler effect between said transmitted and reflected waves; means responsive to said potential for orienting at least said transmitting means into a position with respect to the course of the aircraft along the ground in which said difference is reduced to zero; and means responsive to the orientation of said transmitting means for correcting the rudder control means.

8. A system for controlling the direction of a craft including means for transmitting wave energy to an object, orientable directive means orientable at an angle of deviation with respect to the direction of relative motion between said craft and said object and adapted to receive reflected waves from said object, means for comparing waves derived from said transmitting means with received waves derived from said receiving means comprising means for modulating said received waves by a reference signal to provide a modulated wave at a frequency which is a function of the frequency difference between the transmitted and reflected waves, means for deriving from said modulated wave a variable potential whose magnitude and sense are a function, respectively, of the magnitude and sense of said angle of deviation of said orientable directive means, means responsive to said potential for orienting said orientable means in a direction tending to reduce the magnitude of said potential, means operating the craft's steering mechanism, and means responsive to orientation of said orientable means to alter the course of said craft with respect to said object.

9. A system for controlling the direction of a craft including means for transmitting substantially continuous wave energy to an object, orientable directive means orientable at an angle of deviation with respect to the direction of relative motion between said craft and said object and adapted to receive reflected waves from said object, means for comparing waves derived from said transmitting means with received waves derived from said receiving means comprising means for modulating said received waves by a reference signal to provide a modulated wave at a frequency which is a function of the frequency difference between the transmitted and reflected waves, means for deriving from said modulated wave a variable potential whose magnitude and sense are a function, respectively, of the magnitude and sense of said angle of deviation of said orientable directive means, means responsive to said potential for orienting said orientable means in a direction tending to reduce the magnitude of said potential, means operating the craft's steering mechanism, and means responsive to orientation of said orientable means to alter the course of said craft with respect to said object.

References Cited in the file of this patent

UNITED STATES PATENTS

| | | |
|---|---|---|
| 1,864,638 | Chilowsky | June 28, 1932 |
| 1,958,259 | Becker | May 8, 1934 |